July 1, 1930.  V. NYLUND  1,769,535
CROSS CUT SAW HANDLE
Filed Jan. 29, 1929
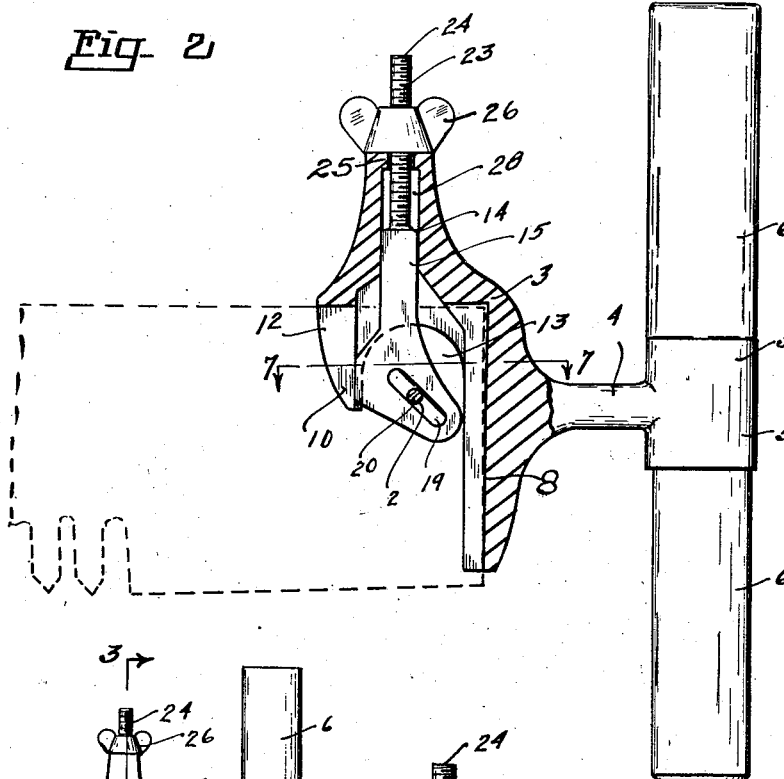
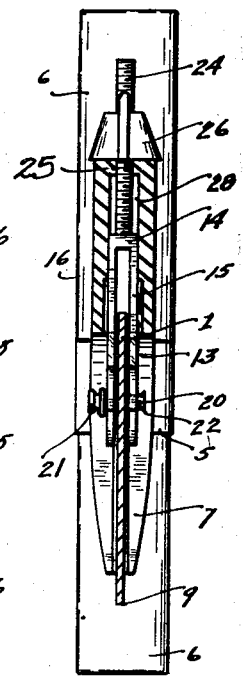
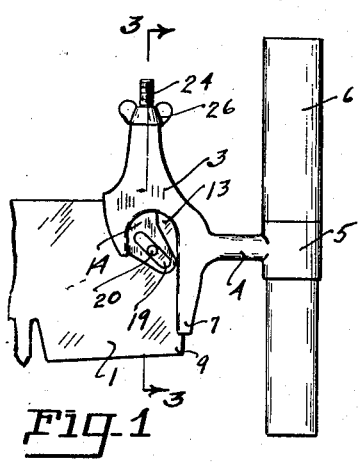
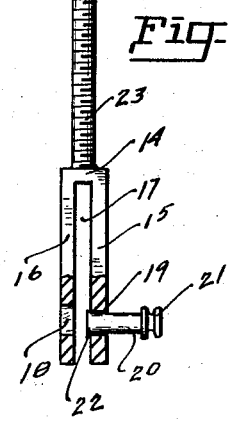
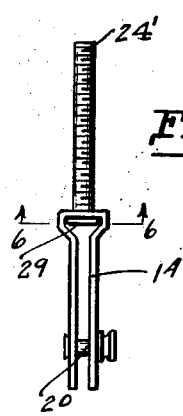
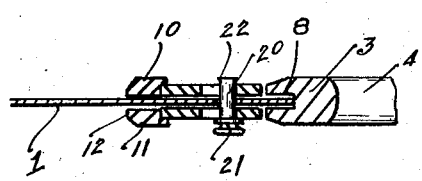
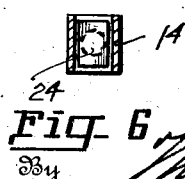
Inventor
Viktor Nylund
By
Attorney Patented July 1, 1930

1,769,535

UNITED STATES PATENT OFFICE

VIKTOR NYLUND, OF VANCOUVER, BRITISH COLUMBIA, CANADA

CROSSCUT-SAW HANDLE

Application filed January 29, 1929. Serial No. 335,910.

The primary purpose and object of my new and improved cross cut saw handle is to provide a simple attaching means for attaching a handle to the blade of a cross cut saw. Heretofore attachments of the kind referred to had a tendency to become loose when attached to the handle as they did not force an intimate contact between the handle fastening and the blade of the saw excepting upon one side. In my new and improved construction the attaching means is forced into intimate contact with the top side and the end of the blade thereby preventing the loosening of the attaching element from the blade.

A further object of my invention consists in an attachment that not only engages the top side of the saw blade but engages the end as well and means being provided for the maintaining of a tight relationship between the saw blade and the handle.

The invention consists primarily of a body element having a ferrule disposed upon one end into which the handle element is made to engage. The body element having a slot formed therein into which the saw blade may be inserted. A locking head is disposed within the body element with means for adjusting the same and an inclined slot is formed within the head. The purpose of the slot is to force a tight engagement between the pin passing through the slot and the head thereby forming a tight contact between the body element, and one side and one end of the saw blade.

A further object of my invention resides in a simple and efficient construction that may be cheaply made and that may be used over a relatively long operating period without alteration or repair.

A still further object of my invention resides in a device that may be easily attached and detached from the saw.

With these and incidental objects in view, the invention consists in certain novel features of construction and combination of parts, the essential elements of which are set forth in the appended claims, and a preferred form of embodiment of which is shown hereafter with reference to the drawings which accompany and form a part of this specification.

In the drawings:

Fig. 1 is a side view of the end of a cross cut saw to which one of my saw handles is attached.

Fig. 2 is an enlarged side view of the saw blade, illustrating the head of my saw handle device, partly in section.

Fig. 3 is a cross section view, taken on line 3—3 of Fig. 1, looking in the direction indicated.

Fig. 4 is an edge view, partly in section, of the locking head shown removed from the body of the device.

Fig. 5 is a modified construction of the device, illustrated in Fig. 4.

Fig. 6 is a cross section view, taken on line 6—6 of Fig. 5, looking in the direction indicated.

Fig. 7 is a cross section view, taken on line 7—7 of Fig. 2, looking in the direction indicated.

Like reference characters refer to like parts throughout the several views.

1 is the blade of a cross cut saw, and 2 is an eye formed at either end of the saw blade.

I preferably form the body or frame 3 of my device of a single piece having an outwardly extending shank 4, in which a ferrule 5 is formed into which the handle 6, may be placed. The body element has a downwardly extending saw-engaging element 7 having a slot 8 formed therein. The end 9 of the saw engaging within the slot. Ears 10 and 11 extend downwardly at the front end of the body or frame with a slot 12 formed therebetween through which the saw also passes. The elements 10 and 11 and the element 7, are in spaced relationship with each other to form a recess 13 in which the locking head 14 is disposed. The locking head 14 has a bifurcated end at its lower end forming the side walls 15 and 16 disposed in spaced relationship with each other to form a passageway 17 through which the saw blade passes. Inclined slots 18 and 19 which are disposed within the side walls of the locking head are in registerable alignment with each other, and one of them is substantially wider than the other. The locking pin 20 passes through one of the side walls. The locking pin has a head 21 disposed upon one end of the same and has an enlarged head 22 disposed upon the oppositely disposed end of the locking pin so that the locking pin may be maintained within the head. An upwardly extending shank 23 is disposed upon the locking head, said shank being screw threaded with threads 24. The shank extends upwardly through the upper end 25 of the body element and a thumb nut 26 engages the shank 23 and rests upon the upper end of the body element.

The locking head may be made of a single piece of metal, as illustrated in Fig. 4 and in Fig. 2, with the upper end of the body portion of the same substantially rectangular in cross sectional area so that the same will not turn around when the same is placed within the rectangular opening 28 in the upper end of the body portion of the locking head. The locking head may be made, as illustrated in Fig. 5, wherein the threaded neck 24' may be made of an independent portion and wherein the body portion of the locking head may be made of sheet stock so formed as to create the side walls in spaced relation with each other and with the head 29 of the threaded element 24' maintained in an irremovable position within the side walls.

When the pin 20 passes through the eye of the saw blade and tension is applied to the thumb screw, the inclined slot causes an upward pressure on the locking head and an end thrust simultaneously that creates a pressure between the end and top side of the saw blade and the body element that locks the same relative to the saw blade.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a cross cut saw blade having an eye, of a body element, a slot formed within the body element to permit the body element to engage the end and the top side of the blade adjacent the end of the blade and to have side walls of the body element disposed each side of the end of the blade, a locking head disposed within the body element, an inclined slot disposed within the side walls of the locking head, a pin disposed within the inclined slot, said pin being adapted for engagement within the eye of the saw, and means for moving the locking head relative to the body element to force an intimate contact of the body element with the top side and the end of the blade.

2. In a device of the class described, in combination with a cross cut saw blade having an eye, of a body element, means associated with the body element to engage the top side and the end of the blade, a locking head adjustably positioned within the body element, an inclined slot disposed within the locking head, a locking pin removably disposed within the slot, said pin adapted for engagement within the eye of the saw, and means for imparting a forced movement of the locking head relative to the body element to lock the blade relative to the body element.

3. In a device of the class described, in combination with a cross cut saw blade having an eye, of a body element, a slot formed within the body element to receive the saw blade therein and to engage one side and one end of the blade simultaneously, a locking head adjustably positioned within the body element, bifurcated legs downwardly extending from the body portion of the locking head, an inclined slot disposed within each leg, a pin disposed within the slot and adapted for passage through the eye of the saw blade, and means for imparting an endwise movement of the locking head relative to that of the body element to forcibly engage the body element with one side and one end of the saw blade.

4. In a device of the character described, in combination with a cross cut saw blade having an eye, of a body element, a handle secured to the side of the body element, a slot formed in the body element to receive one end and one side of the saw simultaneously, a boss formed on the upper portion of the body having a squared opening terminating in a restricted opening, a saw engaging head, a shank formed on the head to correspond to the squared opening in the boss, an anchor pin extending through the eye of the saw blade and through angular slots in the saw engaging head, and means for causing vertical movement of the saw engaging head and shank associated with the above mentioned boss.

5. In a device of the character described, in combination with a cross cut saw having an eye, of a body portion having an end extension, a handle secured to the end extension, a vertical boss formed on the body portion having a central squared opening terminating in a restricted opening, a slot formed in the body portion for engaging the upper and end edges of the saw blade, a squared bifurcated shank slidably mounted in the above mentioned boss corresponding to the squared central opening therein, a screw threaded extension formed on the shank extending through the restricted opening in the boss, a wing nut threaded on the screw threaded extension for holding the shank in a locked position, a saw blade engaging head formed on each furcation of the shank, said heads having angular slots, and a pin passing through the eye of the saw blade and the angular slots whereby vertical movement of the shank will cause the saw blade to be moved into close engagement with the end and top portions of the slot formed in the body element.

VIKTOR NYLUND.